Aug. 27, 1946.　　　　R. E. MASON　　　　2,406,430
REVERSIBLE SINGLE PHASE MOTOR
Filed June 15, 1943　　　2 Sheets-Sheet 1

WITNESSES:
N. F. Susser
F. P. Lyle

INVENTOR
Robert E. Mason.
BY O. B. Buchanan
ATTORNEY

Aug. 27, 1946.   R. E. MASON   2,406,430
REVERSIBLE SINGLE PHASE MOTOR
Filed June 15, 1943   2 Sheets-Sheet 2
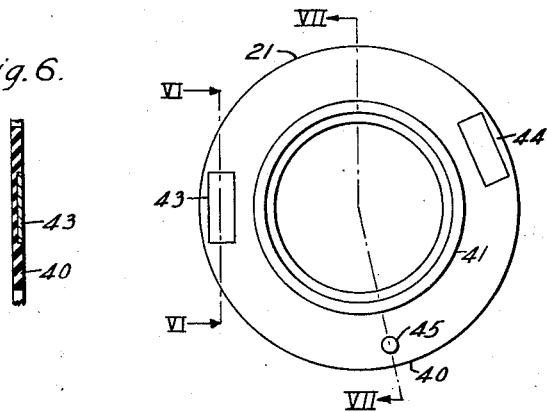
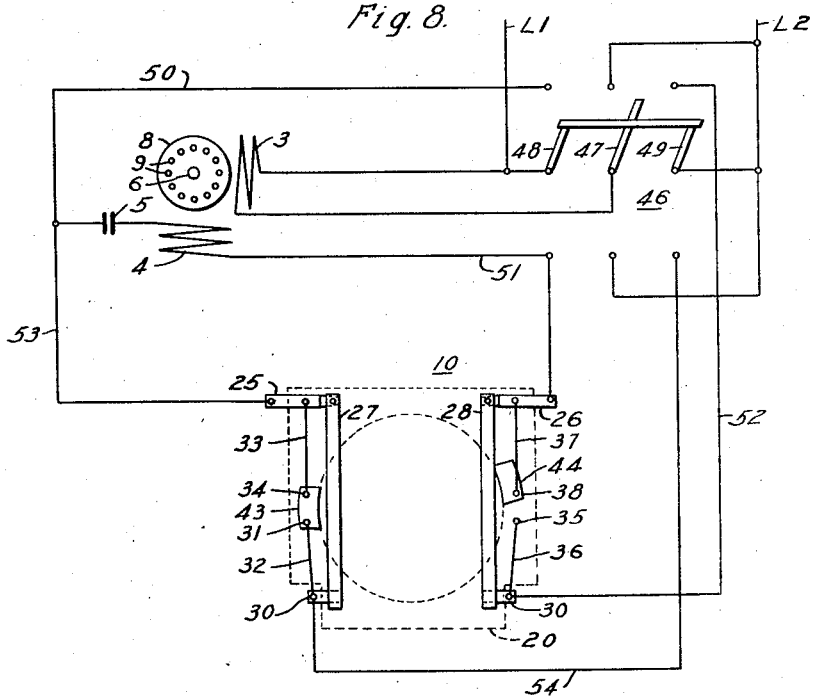
INVENTOR
Robert E. Mason.
BY
ATTORNEY Patented Aug. 27, 1946

2,406,430

UNITED STATES PATENT OFFICE 2,406,430

REVERSIBLE SINGLE-PHASE MOTOR

Robert E. Mason, Sewickley, Pa., assignor to Westinghouse Electric Corporation, East Pittsburgh, Pa., a corporation of Pennsylvania Application June 15, 1943, Serial No. 490,884

7 Claims. (Cl. 172—279)

The present invention relates to reversible single-phase electric motors and, more particularly, to a single-phase motor of either the split-phase or capacitor-start type which is capable of rapid reversing, or plugging, and which does not require any external relay or special starting switch.

Single-phase induction motors of the usual design have a main primary winding and an auxiliary or starting primary winding, which are displaced from each other on the stator of the motor and which carry currents displaced from each other in phase, the phase displacement of the currents being produced either by the design of the windings, as in the split-phase motor, or by connecting a capacitor in series with the auxiliary winding, as in the capacitor-start motor. In starting motors of this type, both windings are connected to the line in parallel, and because of the phase displacement between their currents, a starting torque is developed. After the motor has reached a high enough speed, usually 70% or 80% of the rated full-load speed, the starting winding is disconnected by means of a speed-responsive switch, or equivalent device, and the motor continues to run on the main winding alone.

There are many applications of single-phase motors, such as on hoists, door openers, lathes, etc., where it is necessary or desirable to be able to reverse the motor substantially instantaneously while it is running. This cannot be done in the ordinary type of single-phase motor described above, since reversing the connections of the starting winding while the motor is running has no effect, as this winding is disconnected from the line, and reversing the connections of the main winding has no effect while the motor is running, since a single-phase motor will continue to run in whichever direction it has been started. In order to reverse motors of this type by plugging, therefore, it has been necessary to provide external relays and special switches for the purpose of reconnecting the starting winding with its connections reversed while the motor is running in order to obtain a reverse torque. These arrangements greatly increase the cost of the motor because of the cost of the relay and special switch, and are undesirable because of the extra room required for the relay and the necessary provisions for mounting it.

The principal object of the present invention is to provide a reversible single-phase motor of the split-phase or capacitor-start type which can be rapidly reversed, or plugged, while the motor is running, and which does not require any external relay or special starting switch, so that the motor can be made of simple and inexpensive construction.

A further object of the invention is to provide a reversible single-phase motor of the split-phase or capacitor-start type which can be rapidly reversed while running by means of a simple and inexpensive control device mounted in the motor itself and actuated by a speed-responsive device which may be of any usual type.

A more specific object of the invention is to provide a reversible single-phase motor of the split-phase or capacitor-start type having a simple and inexpensive control device mounted in the motor which has means for controlling the circuit of the auxiliary winding to interrupt it at a predetermined speed of the motor in either direction of rotation, and which also has means for establishing a circuit for reconnecting the auxiliary winding to the line with its connections reversed, so that the motor can be quickly reversed while running merely by operating an external line switch, thus eliminating the need for expensive relays or special switches for plug reversing the motor.

The invention will be more fully understood from the following detailed description, taken in connection with the accompanying drawings, in which:

Fig. 5 is a view in front elevation of the movable member of the control device;

Fig. 6 is a sectional view on the line VI—VI of Fig. 5;

Fig. 7 is a sectional view of the movable member on the line VII—VII of Fig. 5; and Fig. 8 is a schematic diagram showing the electrical connections of the motor.

Figure 1:
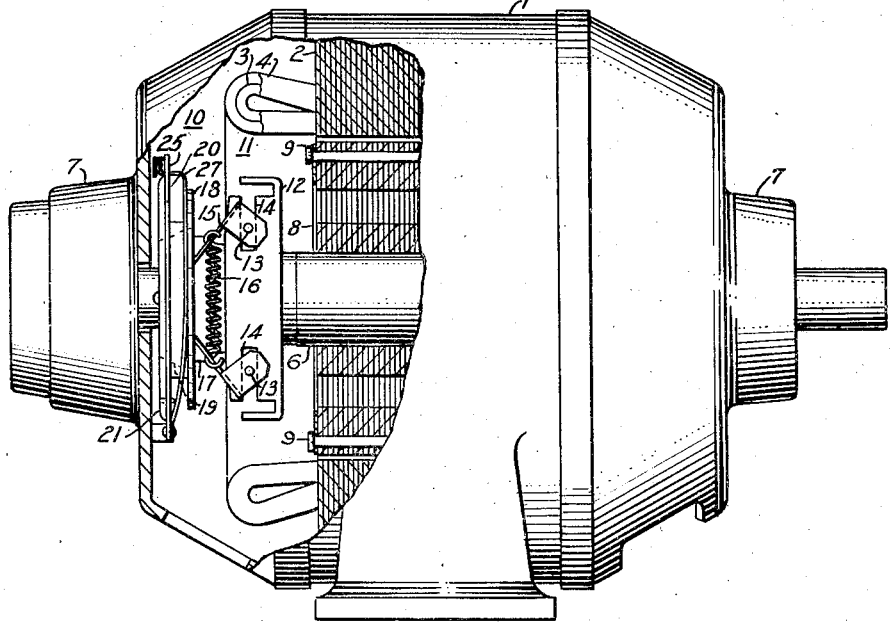
Figure 1 is a view in elevation of a single-phase motor embodying the present invention, with part of the frame broken away to show the control device.

The invention is shown in the drawings as applied to a single-phase motor which has a frame structure 1 in which a laminated stator core 2 of any suitable construction is supported. A main winding 3 and an auxiliary or starting winding 4 are placed in slots in the stator core 2 in the usual manner. These windings are displaced from each other on the stator core approximately 90 electrical degrees, and a phase displacement is produced between their currents by means of a capacitor 5, which is connected in series with the auxiliary winding 4. A capacitor-start motor is shown in the drawing for the purpose of illustration, but it is to be understood that the invention may equally well be applied to the split-phase type of motor, in which the phase displacement between the currents in the main and auxiliary windings is produced by the design of the windings themselves. The motor has a shaft 6, which is supported in suitable bearings, indicated at 7, in the end brackets of the frame 1. A laminated rotor core 8 is secured to the shaft 6 and a suitable secondary winding 9, shown as a squirrel-cage winding, is carried by the rotor core 8.

The operation of the motor is controlled by a control device 10 and a speed-responsive device 11, which may be of any suitable or conventional type. The particular type of speed-responsive device shown in the drawings, for the purpose of illustration, consists of a sheet-metal body 12 which is rigidly secured to the shaft 6, as by a press fit, or in any other suitable manner, and which carries oppositely disposed weight bars 13 guided for radial movement in slots 14 formed in the body 12. A finger plate 15 is mounted on each of the weight bars 13, and the finger plates 15 are urged together by means of a pair of helical tension springs 16, one on each side of the shaft. The finger plates 15 engage in a runner 17 which is axially movable on the shaft 6. The runner 17 has an annular flange 18 with substantially radial surfaces, and an axially extending conical portion 19 which is adapted to frictionally engage the movable member of the control device 10, as explained hereinafter.

While the motor is at rest or running at low speed, the weight bars 13 are held in their inner position by the springs 16 acting through the finger plates 15, as shown in Fig. 1. When the motor has accelerated to a predetermined speed, the centrifugal force acting on the bars 13 becomes great enough to overcome the tension of the springs 16, and the bars 13 move radially outward in the slots 14. This movement of the bars 13 causes the finger plates 15 to draw the runner 17 axially towards the right, as seen in Fig. 1, thus withdrawing it from the control device 10. When the motor slows down below a predetermined speed, which may be lower than the speed at which the bars move outward, the springs 16 draw the bars 13 radially inward causing the finger plates to move the runner 17 to the left to again engage the control device 10.

Figure 2:
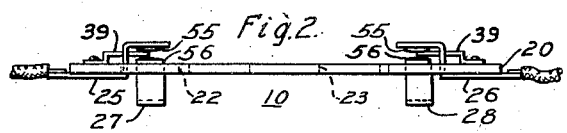
Fig. 2 is a top plan view of the stationary member of the control device.
Figure 3:
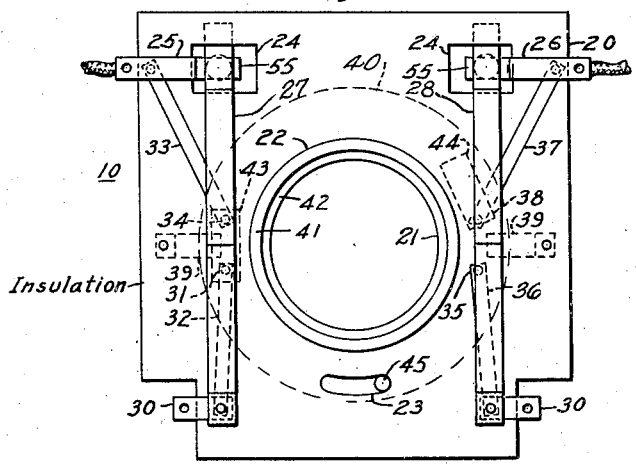
Fig. 3 is a view in front elevation of the assembled control device.

The control device 10 includes a stationary member 20 and a movable contact member 21. The stationary member 20, as more clearly shown in Figs. 2 and 3, is a generally rectangular plate of insulating material, which is mounted on the inside of one of the end brackets of the motor and spaced a small distance from the end bracket. The stationary member 20 has a central opening 22, in which the movable member 21 is received, and a short arcuate slot 23 is provided in the member 20 for limiting the movement of the movable member as described hereinafter. The member 20 also has a pair of small, generally rectangular holes 24 near its upper corners. Contact members 25 and 26 are secured to the front surface of the member 20, and each of the contact members 25 and 26 has a rearwardly bent portion which extends through one of the holes 24 and which carries a suitable contact 55. The stationary member 20 also carries a pair of spring members 27 and 28 which are attached to the front of the member 20 near the bottom thereof and extend almost to the top. Each of the spring members 27 and 28 has a rearwardly bent portion at its upper end which extends through one of the holes 24 and which carries a contact 56 in position to engage the contact 55 of the corresponding contact member 25 or 26. In the normal position of the spring members 27 and 28, as shown in Figs. 2 and 4, the contacts 55 and 56 are separated, and the spring members 27 and 28 are adapted to be forced back by the runner 17 of the speed-responsive device 11 to bring the contacts 55 and 56 into engagement.

A connector 30 of any suitable type is provided at the lower end of each of the springs 27 and 28 for connection of leads to the control device. The lower end of the spring 27, and the corresponding connector 30, are also connected to a fixed contact 31 on the member 20 by means of a thin copper link or strip 32, and the contact member 25 is similarly connected by means of a link 33 to a fixed contact 34. The fixed contacts 31 and 34 may take the form of rivets, and they extend through the stationary member 20 so that they can be bridged at the back of the stationary member by the movable contact member 21 as hereinafter described. It will be seen that the links 32 and 33 provide means for short-circuiting the spring member 27 and contact member 25 when the fixed contacts 31 and 34 are bridged. Similarly, the lower end of the spring member 28, and its connector 30, are connected to a fixed contact 35 by means of a link 36, and the contact member 26 is connected by a link 37 to a fixed contact 38. The contacts 35 and 38 are similar to the contacts 31 and 34, and have the corresponding function of short-circuiting the spring member 28 and contact member 26. The stationary member 20 also has a pair of spring clips 39 secured to its back surface for the purpose of holding the movable member 21 in position.

The movable contact member 21 is also made of insulating material, and it has a generally annular flange portion 40, and a central, axially extending portion 41 which has an outside diameter slightly smaller than the diameter of the central hole 22 of the stationary member 20. The central portion 41 has a conical interior surface 42 which is adapted to be engaged by the conical portion 19 of the runner 17, and it has a minimum internal diameter which is large enough to permit it to encircle the shaft 6 with a reasonable clearance. Two metal contact plates or bridging members 43 and 44 are set in the front surface of the flange portion 40 of the movable member 21 in position to bridge one or the other of the pairs of fixed contacts, 31 and 34, or 35 and 38, on the stationary member 20. A stop pin 45 is mounted in the lower portion of the movable member 21 to limit its movement with respect to the stationary member.

Figure 4:
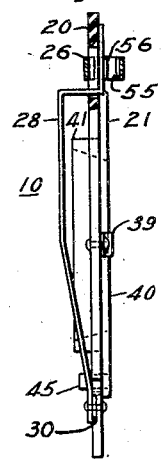
Fig. 4 is a side view of the assembled control device.

The movable member 21 is assembled on the stationary member 20, as shown in Fig. 4, with the central portion 41 extending through the central hole 22 of the stationary member and the stop pin 45 engaging in the arcuate slot 23. The spring clips 39 on the back of the stationary member 20 extend over the flange portion 40 of the movable member 21 and normally hold it tightly against the back of the stationary member, but permit a small axial movement of the movable member. The movable member 21 is also rotatably movable with respect to the stationary member 20, the amount of rotational movement being limited by engagement of the stop pin 45 with the ends of the slot 23. It will be seen from Fig. 5 that the arrangement of the contact plates 43 and 44 is such that when the movable member 21 is rotated to the limit of its rotational travel in the counterclockwise direction, with the stop pin 45 engaging the right-hand end of the slot 23, the plate 43 will be in position to bridge the fixed contacts 31 and 34, thus short-circuiting the spring member 27 and contact member 25. Similarly, when the movable member 21 is moved to the limit of its travel in the opposite direction, with the stop pin 45 engaging the left-hand end of the slot 23, the contact plate 44 will be in position to bridge the fixed contacts 35 and 38, thus short-circuiting the spring member 28 and contact member 26. Thus, the movable member 21 is effective to alternatively bridge one or the other of the two pairs of fixed contacts.

The electrical connections of the motor and control device are shown schematically in Fig. 8. The motor is connected to a single-phase supply line L1, L2 by means of a three-pole double-throw line switch 46. One end of the main winding 3 is connected directly to the line L1, while the other end of the main winding is connected to the line L2 by the center blade 47 of the switch in either position of the switch. The auxiliary winding 4 and the capacitor 5, which is in series with it, are connected to the line L1, L2 by means of the outside blades 48 and 49 of the switch and the control device 10, to cause rotation of the motor in one direction or the other, and to effect reversal of the motor.

The operation of the control device 10 for effecting starting and reversing of the motor is as follows. When the motor is at rest, the speed-responsive device 11 is in the position shown in Fig. 1, with the weight bars 13 in their innermost position and the runner 17 moved to the left. In this position, the annular flange 18 of the runner 17 engages both the spring members 27 and 28 and holds the contacts 56 in engagement with the contacts 55 of the contact members 25 and 26. The conical surface 19 of the runner 17 is in engagement with the internal conical surface 42 of the movable member 21 and holds it a small distance away from the stationary member 20 of the control device 10.

In order to start the motor, the switch 46 is closed in either one of its two positions, depending on the desired direction of rotation. If the switch 46 is closed in its upper position, as shown in Fig. 8, which will be considered to correspond to the forward direction of rotation of the motor, the main winding 3 is connected to the line through the center blade 47 of the switch. A circuit is also established for the auxiliary winding 4 from the line L1 through the blade 48 of the switch, conductor 50, capacitor 5, auxiliary winding 4, conductor 51, contact member 26, spring member 28, conductor 52, and switch blade 49 to the line L2. Since both windings are thus connected across the line in parallel, the motor will start to run in the forward direction, which is counterclockwise as seen in Fig. 8.

As soon as the motor starts to rotate, the runner 17 of the speed responsive device 11 tends to rotate the movable member 21 in the same direction because of the frictional engagement between the conical surfaces 19 and 42, and if the movable member 21 is not already in its extreme counterclockwise position, shown diagrammatically in Fig. 8, the runner 17 moves it to that position, with the contact plate 43 in position to bridge the fixed contacts 31 and 34. As soon as the motor has accelerated to a predetermined speed, the speed-responsive device 11 operates to withdraw the runner 17 from the control device 10. This permits the spring members 27 and 28 to move to their normal positions with the contacts 55 and 56 separated, thus interrupting the circuit of the auxiliary winding 4. At the same time, the spring clips 39 move the movable member 21 up against the back of the stationary member 20 and hold it firmly in position with the contact plate 43 bridging the contacts 31 and 34. This has no immediate effect, however, since the circuit of which these contacts are a part is open at the switch 46, and the motor continues to run in the forward direction on the main winding 3 alone.

If it is now desired to reverse the motor while it is running, it is only necessary to move the switch 46 to its lower, or reverse, position. As soon as the switch closes in this position, a circuit is established for the auxiliary winding 4 from the line L1 through the switch blade 48, conductor 51, winding 4, capacitor 5, conductor 53, contact member 25, link 33, contact 34, contact plate 43, contact 31, link 32, conductor 54, and switch blade 49 to the line L2. Thus, the auxiliary winding 4 is again connected to the line but with its connections reversed, so that a reversing torque is developed to plug reverse the motor as soon as the switch is closed in its lower position. This reverse torque rapidly slows the motor down, and when it has slowed down to a predetermined speed, the speed-responsive device 11 operates to move the runner 17 to the left to again engage in the control device 10. In this movement, the annular flange 18 of the runner 17 first engages the spring members 27 and 28 and moves them to bring the contacts 55 and 56 into engagement. Immediately after these contacts have engaged, the conical surface 19 engages the conical surface 42 of the movable member 21 and pushes the movable member back a short distance away from the stationary member 20. This removes the bridging connection between the fixed contacts 31 and 34, but since the spring member 27 has previously been brought into contact with the contact member 25, the circuit is transferred to the spring member 27 and the auxiliary winding 4 is still connected to the line. The reverse torque continues to slow the motor down until its speed passes through zero, and the motor then starts to accelerate in the reverse direction.

As soon as the motor reverses, the runner 17, which is still in engagement with the movable member 21, rotates it in the clockwise direction as far as the stop pin 45 will permit, which brings the contact plate 44 into position to bridge the fixed contacts 35 and 38. When the motor has accelerated to a predetermined speed in the reverse direction, the speed-responsive device 11 operates to withdraw the runner 17 from the control device 10, thus permitting the movable member 21 to be brought up against the back of the fixed member 20 by the spring clips 39, and permitting the spring members 27 and 28 to separate the contacts 55 and 56. This breaks the circuit of the auxiliary winding 4, since the contact plate 43 has been moved away from its bridging position, and the motor continues to rotate in the reverse direction on the main winding 3 alone.

If it is now desired to again operate the motor in the forward direction, the switch 46 is returned to its upper position. In this position, a circuit is established from the line L1 through the switch blade 48, conductor 50, capacitor 5, auxiliary winding 4, conductor 51, contact member 26, link 37, fixed contact 38, contact plate 44, fixed contact 35, link 36, conductor 52 and switch blade 49 to the line L2. Thus, the auxiliary winding 4 is again energized with its connections reversed to produce a torque in the forward direction, which rapidly slows the motor down and reverses its direction of rotation. The operation of the speed-responsive device 11 as the motor slows down, reverses and then accelerates in the forward direction, is the same as described above to successively effect closure of both sets of contacts 55 and 56, to move the movable member 21 away from the stationary member 20 and rotate it to its opposite position, and then to permit the contacts 55 and 56 to separate and the contact plate 43 to bridge the contacts 31 and 34 to short-circuit the spring 27 and contact member 25 and establish a circuit for the auxiliary winding 4 for subsequent reversal of the motor.

Thus, when the motor is running in either direction, it can be reversed substantially instantaneously merely by moving the line switch 46 to its other position, since the movable contact member 21 has established a circuit for reconnecting the auxiliary winding 4 in the reverse direction, and this circuit is completed by operation of the switch 46. When the motor is at rest, it can be started in either direction since both spring members 27 and 28 have their contacts closed and the auxiliary winding can therefore be connected to the line in either direction by the switch 46. As soon as the motor starts to run, the movable member 21 of the control device is moved to the proper position to establish the circuit connections for reversing, if it is not already in that position, and thus the motor can be reversed immediately after starting, if desired.

It will be seen that in the operation of the control device 10, the spring members 27 and 28 function to control the circuit of the auxiliary winding 4 to interrupt it when the motor has accelerated to a predetermined speed in either direction of rotation, and that the movable member 21 functions to establish circuits for reconnecting the auxiliary winding 4 to the line with its connections reversed, these circuits being completed by operation of the line switch 46 from one position to the other. Thus, a very simple and relatively inexpensive arrangement is provided for rapidly reversing, or plugging, a single-phase motor without the use of external relays or special switches. This is very advantageous since it greatly reduces the cost of single-phase motors for plugging service by eliminating the cost of the relay, which has been necessary heretofore, as well as the cost of providing a suitable mounting for the relay on the motor bracket. The control device is simple and positive in action and effects instantaneous reversal of the motor as soon as the line switch is moved from one position to the other. It thus provides the desired operation in a very simple manner.

It will be understood that various modifications are possible without departing from the spirit of the invention. Any type of three-pole line switch which has two operating positions may be used, and the control device 10 may be modified in various obvious ways. Thus, it is not strictly necessary that the movable member 21 be axially movable with respect to the stationary member 20, although it is desirable to move it away from the stationary member while its position is being changed in order to eliminate frictional resistance and wear, and thus to obtain more reliable operation.

Various other modifications may be made if desired, and it is to be understood that the invention is not limited to the particular details of construction shown and described for purposes of illustration, but in its broadest aspect it includes all equivalent modifications and embodiments which come within the scope of the appended claims.

I claim as my invention:

1. A reversible single-phase induction motor having a main primary winding and an auxiliary primary winding, switch means for connecting said windings to a single-phase supply line, said switch means having a forward position for operation of the motor in one direction and a reverse position for operation of the motor in the other direction, and control means mounted on the motor, said control means including movable contacts connected in the circuit of said auxiliary winding for effecting interruption of said circuit, said control means also including a first pair of stationary contacts for connecting the auxiliary winding to the line through said switch means in the forward position thereof, and a second pair of stationary contacts for connecting the auxiliary winding to the line in the reverse direction through said switch means in the reverse position thereof, a movable contact member having means for alternatively bridging one or the other of said pairs of stationary contacts, and means responsive to the speed of the motor for actuating said movable contacts to interrupt the circuit of the auxiliary winding when the motor reaches a predetermined speed in either direction of rotation, said speed-responsive means also being operative to move said contact member to bridge said second pair of stationary contacts when the motor is rotating in the forward direction and to bridge said first pair of stationary contacts when the motor is rotating in the reverse direction.

2. A reversible single-phase induction motor having a main primary winding and an auxiliary primary winding, switch means for connecting said windings to a single-phase supply line, said switch means having a forward position for operation of the motor in one direction and a reverse position for operation of the motor in the other direction, and control means mounted on the motor, said control means including a first movable contact for connecting the auxiliary winding to the line through said switch means in the forward position thereof, and a second movable contact for connecting the auxiliary winding to the line in the reverse direction through said switch means in the reverse position thereof, said control means also including a first pair of stationary contacts in parallel with said first movable contact and a second pair of stationary contacts in parallel with said second movable contact, a movable contact member having means for alternatively bridging one or the other of said pairs of stationary contacts, and means responsive to the speed of the motor for actuating said movable contacts to interrupt the circuit of the auxiliary winding when the motor reaches a predetermined speed in either direction of rotation, said speed-responsive means also being operative to move said contact member to bridge said second pair of stationary contacts when the motor is rotating in the forward direction and to bridge said first pair of stationary contacts when the motor is rotating in the reverse direction.

3. A reversible single-phase induction motor having a main primary winding and an auxiliary primary winding, switch means for connecting said windings to a single-phase supply line, said switch means having a forward position for operation of the motor in one direction and a reverse position for operation of the motor in the other direction, and a control device mounted on the motor, said control device including a stationary member, movable contacts on said stationary member connected in the circuit of said auxiliary winding, a first pair of fixed contacts on the stationary member adapted when connected together to connect the auxiliary winding to the line through said switch means in its forward position, a second pair of fixed contacts on the stationary member adapted when connected together to connect the auxiliary winding to the line in the reverse direction through the switch means in its reverse position, a movable member mounted for limited movement with respect to said stationary member and having contact means thereon for alternatively bridging one or the other of said pairs of fixed contacts, and means responsive to the speed of the motor for causing said movable contacts to open when the motor reaches a predetermined speed in either direction of rotation, said speed-responsive means also engaging said movable member to move it to bridge said second pair of fixed contacts when the motor is rotating in the forward direction and to bridge said first pair of fixed contacts when the motor is rotating in the reverse direction.

4. A reversible single-phase induction motor having a main primary winding and an auxiliary primary winding, switch means for connecting said winding to a single-phase supply line, said switch means having a forward position for operation of the motor in one direction and a reverse position for operation of the motor in the other direction, and a control device mounted on the motor, said control device including a stationary member, a first movable contact on said stationary member for connecting the auxiliary winding to the line through said switch means in the forward position thereof, a second movable contact on said stationary member for connecting the auxiliary winding to the line in the reverse direction through said switch means in the reverse position thereof, a first pair of fixed contacts on the stationary member connected in parallel with said first movable contact, a second pair of fixed contacts on the stationary member connected in parallel with said second movable contact, a movable member mounted for limited movement with respect to said stationary member and having contact means thereon for alternatively bridging one or the other of said pairs of fixed contacts, and means responsive to the speed of the motor for causing said movable contacts to open when the motor reaches a predetermined speed in either direction of rotation, said speed-responsive means also engaging said movable member to move it to bridge said second pair of fixed contacts when the motor is rotating in the forward direction and to bridge said first pair of fixed contacts when the motor is rotating in the reverse direction.

5. A reversible single-phase induction motor having a main primary winding and an auxiliary primary winding, switch means for connecting said windings in parallel to a single-phase supply line, said switch means having a forward position for operation of the motor in one direction of rotation and a reverse position for operation of the motor in the other direction, and a control device mounted on the motor, said control device comprising a stationary member, first and second movable contact means on the stationary member, said movable contact means being biased to the open position, the first movable contact means being connected between one end of the auxiliary winding and the switch means in the forward position thereof, said end of the auxiliary winding being also connected to the switch means in the reverse position thereof, the second movable contact being connected between the other end of the auxiliary winding and the switch means in the reverse position thereof, said other end of the auxiliary winding being also connected to the switch means in the forward position thereof, a first pair of fixed contacts on the stationary member, means connecting said fixed contacts across said first movable contact means, a second pair of fixed contacts on the stationary member, means connecting the second pair of fixed contacts across said second movable contact means, a movable member mounted on said stationary member for limited movement with respect thereto, said movable member having contact means thereon for alternatively bridging one or the other of said pairs of fixed contacts, and a speed-responsive device actuated in response to the speed of the motor, said speed-responsive device engaging both said movable contact means to maintain them in closed position when the motor is at rest or running below a predetermined speed and being operative to release said movable contact means to permit them to open when the motor is running above said speed, said speed-responsive device also being adapted to engage said movable member to move it to bridge said second pair of fixed contacts when the motor is running in the forward direction, and to move it to bridge said first pair of fixed contacts when the motor is running in the reverse direction.

6. A reversible single-phase induction motor having a main primary winding and an auxiliary primary winding, switch means for connecting said windings to a single-phase supply line, said switch means having two operating positions, a control device in the motor for controlling the connection of said auxiliary winding to the line, said control device including two contact means, one of said contact means being connected between the auxiliary winding and the switch means in one operating position of the switch means to connect the auxiliary winding to the line for one direction of rotation, and the other of said contact means being connected between the auxiliary winding and the switch means in the other operating position of the switch means to connect the auxiliary winding to the line for the opposite direction of rotation, means for alternatively short-circuiting one or the other of said contact means, means for actuating said short-circuiting means in response to the direction of rotation of the motor, and means for actuating both of said contact means substantially simultaneously at a predetermined speed of rotation of the motor in either direction.

7. A reversible single-phase induction motor having a main primary winding and an auxiliary primary winding, switch means for connecting said windings to a single-phase supply line, said switch means having two operating positions, a control device in the motor for controlling the connection of said auxiliary winding to the line, said control device including two contact means, one of said contact means being connected between the auxiliary winding and the switch means in one operating position of the switch means to connect the auxiliary winding to the line for one direction of rotation, and the other of said contact means being connected between the auxiliary winding and the switch means in the other operating position of the switch means to connect the auxiliary winding to the line for the opposite direction of rotation, means for alternatively short-circuiting one or the other of said contact means, and a speed-responsive device in the motor, said speed-responsive device being adapted to actuate said short-circuiting means in response to the direction of rotation of the motor, and to actuate both of said contact means substantially simultaneously at a predetermined speed of rotation of the motor in either direction.

ROBERT E. MASON.